(12) United States Patent
Iraschko et al.

(10) Patent No.: US 7,484,602 B2
(45) Date of Patent: Feb. 3, 2009

(54) ADJUSTING DEVICE FOR PNEUMATICALLY ACTUATED DISC BRAKES, AND DISC BRAKE

(75) Inventors: Johann Iraschko, Schweitenkirchen (DE); Manfred Schoenauer, Munich (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 139 days.

(21) Appl. No.: 11/583,807

(22) Filed: Oct. 20, 2006

(65) Prior Publication Data

US 2007/0158144 A1 Jul. 12, 2007

Related U.S. Application Data

(63) Continuation of application No. PCT/EP2005/004124, filed on Apr. 19, 2005.

(30) Foreign Application Priority Data

Apr. 20, 2004 (DE) .................. 10 2004 019 723

(51) Int. Cl.
*F16D 65/56* (2006.01)
(52) U.S. Cl. .................. 188/196 BA; 188/196 V; 188/202
(58) Field of Classification Search ............. 188/71.9, 188/72.7, 196 D, 196 P, 196 V, 202
See application file for complete search history.

(56) References Cited

U.S. PATENT DOCUMENTS

| 5,353,896 | A | 10/1994 | Baumgartner et al. |
| 5,379,867 | A | 1/1995 | Macke et al. |
| 5,449,052 | A * | 9/1995 | Macke et al. ............... 188/71.9 |
| 5,794,738 | A * | 8/1998 | Forni et al. ................ 188/71.9 |
| 6,213,255 | B1 | 4/2001 | Neuwirth |
| 6,820,730 | B2 * | 11/2004 | Angerfors .................. 188/71.9 |
| 2007/0209890 | A1 * | 9/2007 | Iraschko ..................... 188/203 |

FOREIGN PATENT DOCUMENTS

| DE | 43 07 017 C2 | 12/1993 |
| DE | 198 14 807 C2 | 9/2001 |
| EP | 0 531 321 B1 | 3/1993 |

OTHER PUBLICATIONS

International Search Report dated Aug. 8, 2005.

* cited by examiner

*Primary Examiner*—Christopher P Schwartz
(74) *Attorney, Agent, or Firm*—Crowell & Moring LLP

(57) ABSTRACT

An adjusting device for a disc brake, especially a pneumatically operated disc brake, is used for rotating and thus axially moving at least one rotary spindle that is provided with internal teeth composed of one or several axially extending grooves. The adjusting device includes an output bush that is provided with external teeth which engage into the internal teeth of the rotary spindle, as well as a monolithic or multipart release spindle. The release spindle axially penetrates the adjusting device and is used for manually releasing the same. The spindle is disposed and/or mounted in such a way that rotations of the spindle below a threshold torque, which are caused by vibrational stress during operation of the disc brake, are prevented. The adjusting device is characterized in that the spindle or a part that is connected to the spindle in a torsion-proof manner is also provided with external teeth which engage directly into the internal teeth of the rotary spindle as well.

13 Claims, 3 Drawing Sheets

A-A

ADJUSTING DEVICE FOR PNEUMATICALLY ACTUATED DISC BRAKES, AND DISC BRAKE

CROSS-REFERENCE TO RELATED APPLICATIONS

This application is a continuation of PCT International Application No. PCT/EP2005/004124, filed on Apr. 19, 2005, which claims priority under 35 U.S.C. §119 to German Application No. 10 2004 019 723.7, filed Apr. 20, 2004, the entire disclosures of which are expressly incorporated by reference herein.

BACKGROUND AND SUMMARY OF THE INVENTION

The invention relates to an adjusting device of a disc brake, in particular of a pneumatically operated disc brake, and to a disc brake containing such an adjusting device.

Adjusting devices on disc brakes are used to compensate for brake linings, which become thinner as a result of wear. The adjusting devices displace the brake linings in the direction of the disc brake in order to set a desired amount of air "play" so that the working stroke necessary for braking remains constant.

Adjusting devices of a generic type are known from the European patent EP 0 531 321 B1 (having a U.S. counterpart U.S. Pat. No. 5,353,896). With regard to the individual details of the functioning of the generic adjusting device, and an example of a disc brake which can be activated by a rotary lever and for which the adjuster of the generic type, but also the adjuster according to the invention, are suitable, reference is made to the entire contents of U.S. Pat. No. 5,353,896, the specification of which is expressed incorporated by reference herein.

The adjusting devices illustrated in EP 0 531 321 B1 have proven to be highly effective. They are arranged in the interior of rotary spindles, which are fitted with pressure elements which act on one of the brake linings. They are suitable for disc brakes of various types, which have in common the fact that they have one or more rotary spindles.

During an adjusting movement when braking, the known adjusting devices transmit, by way of a drive output sleeve, a torque to its associated rotary spindle, which is fitted with the pressure element at its end facing the brake disc. The pressure element acts on the lining carrier plate of a brake lining. The rotational movement of the rotary spindle causes the pressure element to be displaced axially in the direction of the disc brake in order to compensate for a reduction in the thickness of the brake lining material caused by wear. In order to ensure the adjusting function, the adjusting devices generally have a free-wheel, so that the adjuster does not rotate backwards when the brake is released, and an overload coupling which responds when the pressure elements are applied to the brake lining.

The drive output sleeve of the prior art is provided on its outer periphery with at least one radially projecting tooth-like tooth for engaging in at least one corresponding tooth-like groove on the inner periphery of the rotary spindle. Although this arrangement has proven effective, there is needed, in particular, a way to prevent an excessive or insufficient air play adjustment as a result of vibration loading and the like.

Against this background, the invention meets this need by providing an adjusting device further optimized in functionality. The adjusting device reliably prevents, in particular, that an air play is set to too low a value.

According to the invention, an adjusting device of disc brake, in particular of a pneumatically operated disc brake is provided, which adjusting device serves to rotate and, therefore, axially move at least one rotary spindle which is provided with an inner toothing including one or more axially running grooves. The adjusting device has a drive output sleeve with an outer toothing. The outer toothing engages in the inner toothing of the rotary spindle. A single-part or multi-part release spindle, is provided which extends axially through the adjusting device and serves to manually release the adjusting device. The spindle is arranged and/or mounted so as to prevent rotations of the spindle below a limit torque which is greater than the torques caused by vibration loading during operation of the disk brake. The spindle, or a component which is rotationally fixedly connected to the spindle, has an outer toothing, which likewise engages directly in the groove-like inner toothing of the setting spindle.

According to an aspect of the invention, an adjusting device is provided which compensates, without play, for all production tolerances at the interface between the drive output sleeve of the adjusting device and the adjusting rotary spindle (typically a threaded tube) without jamming occurring as the adjusting shaft is rotated and displaced.

In contrast to this, the adjusting properties are positively influenced even in the case of vibration loading, rotation and displacement of the adjuster shaft relative to the threaded tube or rotary spindle shaft, repeated tests on the basis of static application, and combinations of these.

The drive output sleeve and the spindle are, preferably, decoupled from one another, and are, in particular, rotatable relative to one another to a limited extent.

It is particularly preferable for a star-shaped driver to be placed on the spindle, the star-shaped driver being rotationally fixedly connected to the spindle and having the outer toothing which engages in the inner toothing of the rotary spindle.

This can be provided in a simple manner according to a first embodiment of the invention in that the drive output sleeve has a cut-out in its peripheral wall. The star-shaped driver extends radially through the cut-out, with the star-shaped driver having the outer toothing only in the region.

Alternatively, this can also be provided in a simple manner in that the star-shaped driver and the drive output sleeve are arranged so as to be axially offset relative to one another.

The invention also provides a disc brake having the inventive adjusting device.

In summary, the invention offers the advantage of greatly improved functionality with unchanged installation space requirements and approximately unchanged production costs.

Further advantageous embodiments are described and claimed herein.

Other objects, advantages and novel features of the present invention will become apparent from the following detailed description of the invention when considered in conjunction with the accompanying drawings.

DETAILED DESCRIPTION OF THE DRAWINGS

Figure 3:
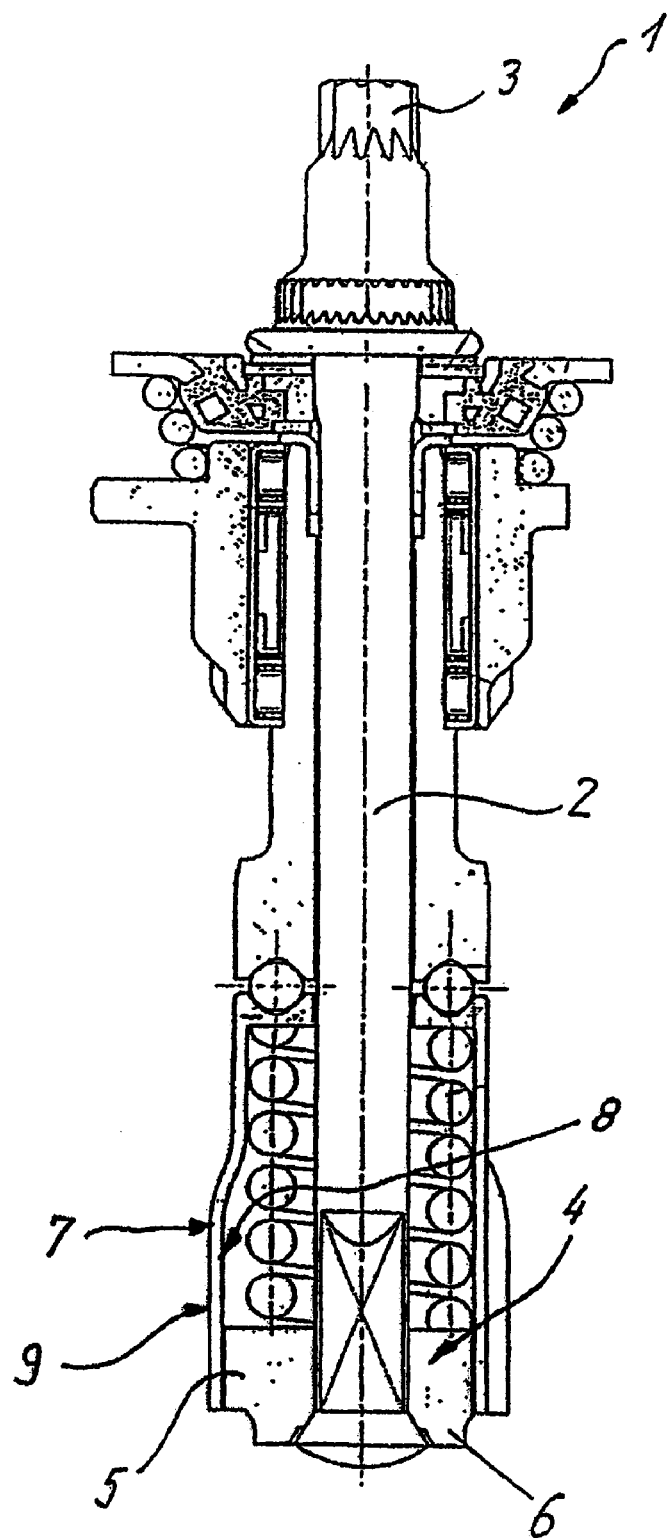
FIG. 3 shows a section view through an adjuster according to the prior art.

FIG. 3 shows an adjusting device according to the prior art. Such an adjusting device has a number of properties in common with the adjuster in FIG. 5 of EP 0 531 321 B1. The adjusting device is particularly suitable for installation in a rotary-lever-actuated, pneumatically actuated disc brake, whose basic design can correspond to that of EP 0 531 321 B1, so that for more detail, reference is made to that document.

Figures 1, 1A:
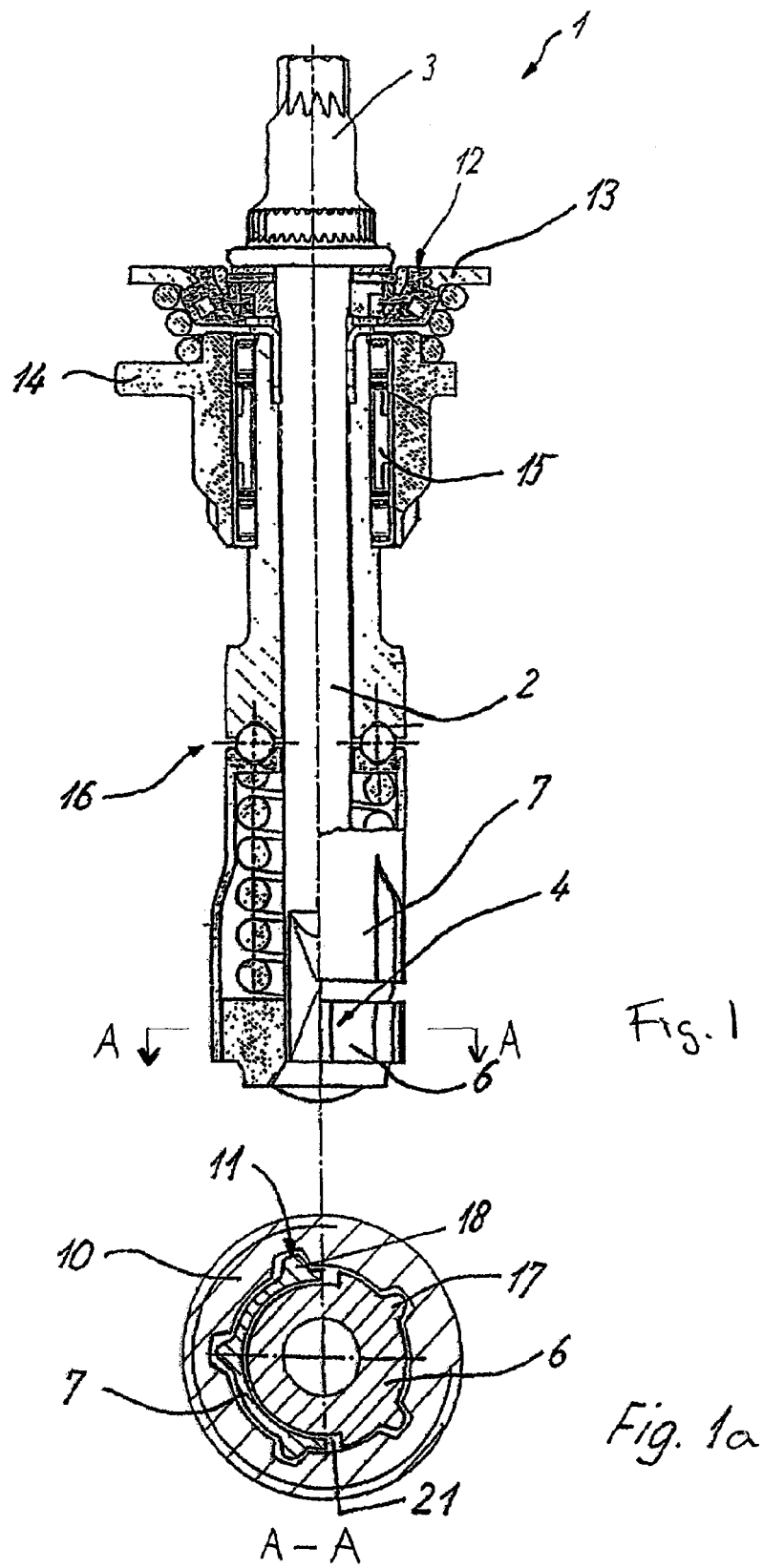
FIGS. 1 and 1a show section views of a first adjuster according to the invention.

The adjusting device in FIG. 3 is designed, according to the type of EP 0 531 321 B1, FIG. 1, to be placed in a recess, which faces away from the brake disc, of a setting spindle which is not rotatable, but is axially displaceable, relative to the adjusting device in order to compensate for the wear of the brake linings of the disc brake by way of a change in the overall length of the two components, the adjusting device and the setting spindle, in order to keep the air play as constant as possible. The adjusting device is particularly suitable for disc brakes having two setting spindles, which are synchronized with one another by a synchronization device. There, an adjusting device is preferably arranged in only one of the setting spindles, and the second setting spindle is rotated with it by use of the synchronization device.

An adjuster whose design largely corresponds to that in FIG. 3 of the present application is otherwise also presented in German patent document DE 198 14 807 C2 (having a U.S. counterpart U.S. Pat. No. 6,213,255 B1).

The adjusting device 1 in FIG. 3 is supported in a brake caliper. The adjusting device 1 has a single-part or multi-part spindle 2, which extends over the entire length of the adjusting device 1 and ends, at the end remote from the brake disc, in a polygonal head 3, which is actuated manually, for example by means of a wrench, for resetting the adjusting device. And, at the end facing the brake disc, the spindle 2 ends in a radially widened end section 4. The radially widened end section 4, having a larger diameter than the rest of the spindle, is in this case formed by a star-shaped driver 6, which is provided with an outer toothing 5 and is rotationally fixedly connected to the spindle 2 and is surrounded concentrically by a correspondingly shaped drive output sleeve 7. The output sleeve 7 is provided on one side with an inner toothing 8 and, on the other side, with an outer toothing 9. These toothings 8, 9 engage in axially running grooves 11 provided on the inner periphery of the setting spindle 10 (see FIG. 1a). At least one tooth and one corresponding groove are required in each case to transmit torque.

When the spindle 2 of the adjusting device rotates, the star-shaped driver 6 and the drive output sleeve 7 also rotate, so that the outer toothing 9 rotates the setting spindle 10, which has the outer thread, with it as a result of the engagement in the grooves 11.

On the other hand, when the drive output sleeve 7, which is driven by the application device of the disc brake via a plurality of intermediate elements (explained below), is rotated in the event of an application, it also drives with it the star-shaped driver 6 and therefore also the spindle 2 and the rotary spindle 10.

Since the rotary spindle 10, in turn, has the outer thread, by way of which it is screwed into a part (not illustrated here) of the application device, the axial length of the overall system comprising the setting spindle 10 and the adjusting device 1 with the spindle 2 changes when the rotary spindle 7 and the spindle 2 are rotated, resulting in the air play being adjusted.

To hold the brake caliper, the adjusting device has a positionally fixed part 12—here a ring-shaped part with a flange 13—which is arranged so as to be non-displaceable axially relative to the spindle 2, with the spindle 2 being mounted in the annular part 12 so as to be rotatable.

A radially projecting lever 14 on the spindle 2 serves as a drive input device for the adjusting device.

The lever 14 can, for example, be coupled to a rotary lever of the disc brake so as to be rotated in one direction when the disc brake is applied, and in the opposite direction when the disc brake is released.

So that the rotary spindle 10 is rotated to compensate for the air play only when the disc brake is applied, and is not rotated in the opposite direction when the disc brake is released, a free-wheeling (clutch) device 15, which permits rotation of the drive output sleeve 7 with the lever 14 only when the disc brake is applied, and a torque-limiting arrangement in the form of an overload coupling 16, provided here as a ball ramp arrangement, are arranged between the lever 14 and the drive output sleeve 7. Such an arrangement is described in detail in EP 0 531 321 B1.

In order to prevent undesired rotations as a result of vibration loading and the like, the spindle 2 is provided with a friction torque, that is to say, it can not be rotated below a limit torque.

Figure 2:
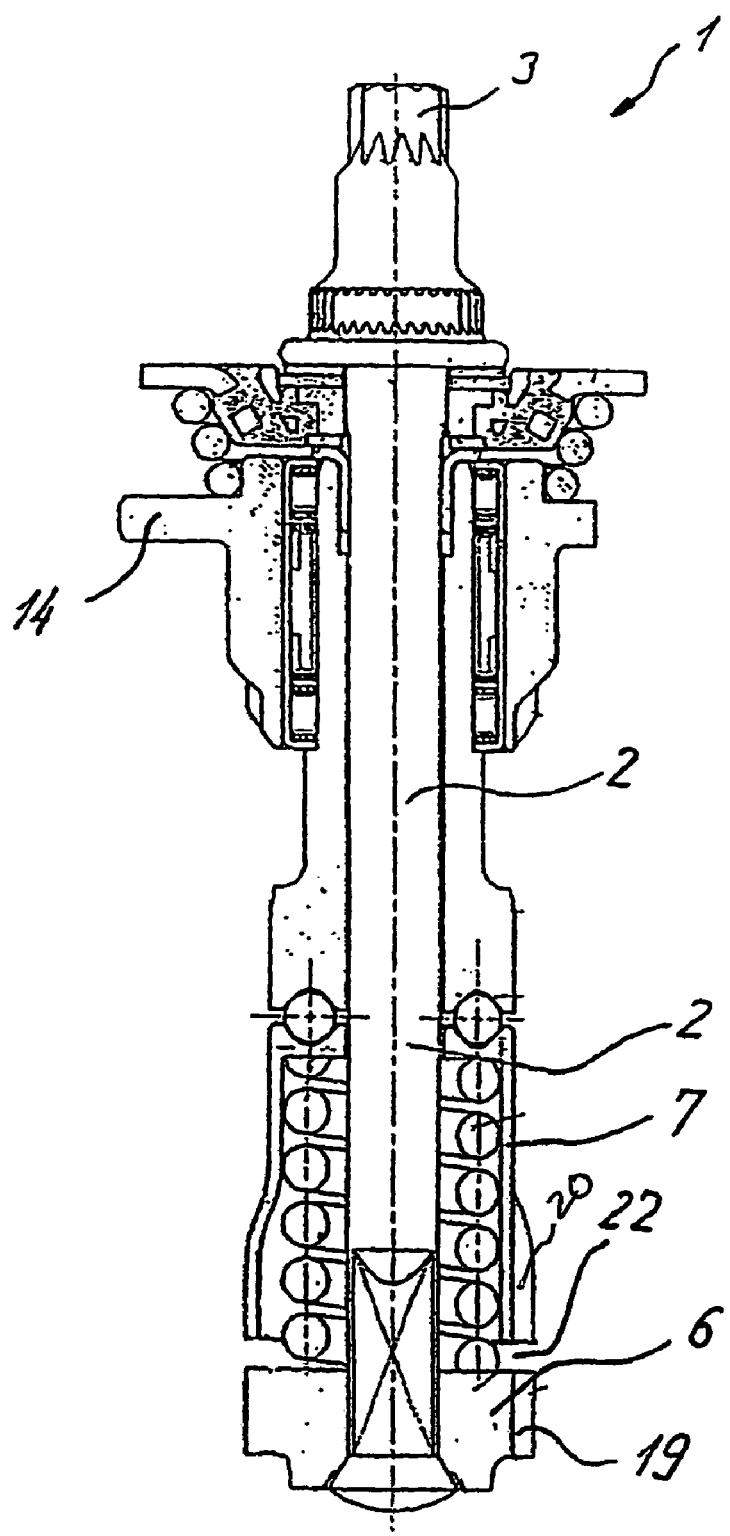
FIG. 2 shows a section view of a second adjuster according to the invention.

The invention utilizes this effect in particular in that, in alternative embodiments according to FIG. 1 and FIG. 2, the invention provides direct engagement both of the spindle 2, or of a part (in this case the star-shaped driver 6) which is rotationally fixedly connected to the spindle 2, and of the drive output sleeve 7 in the grooves 11 of the rotary spindle 10 (shown only in the lower cross-section view of FIG. 1 for clarity), and in doing so in particular decouples the drive output sleeve 7 and the spindle 2 from one another.

According to FIG. 1a, the decoupling is provided in that the drive output sleeve 7 has a cut-out 21 over at least part of its axial length, the driver extending outward through the cut-out 21, with the drive output sleeve 7 according to FIGS. 1 and 2 having no inner toothing, and the star-shaped driver 6 having no outer toothing, in the region in which the star-shaped driver 6 is concentric with respect to the drive output sleeve 7, as shown in the cross-section in FIG. 1 taken at line A-A.

The direct engagement of the spindle 2, or in this case of the star-shaped driver 6 which is rotationally fixedly connected to the spindle 2, in the grooves 11 of the setting spindle 10 is provided according to FIG. 1 in that the star-shaped driver 6, in its radial section which extends through the cut-out 21, has an outer toothing 17 with at least one tooth which engages in the at least one groove 11 of the rotary spindle 10. The drive output sleeve 7 in this case likewise has an outer toothing 18 which engages in the groove 11, it being possible for the outer toothing 18 to begin axially before the region of the star-shaped driver 6, and the outer toothing 18 continuing here axially to the end of the drive output sleeve as far as the region of the cut-out.

Here, the drive output sleeve 7 and the star-shaped driver 6 are designed such that they are rotatable relative to one another to a limited extent.

According to FIG. 2, the drive output sleeve 7 and the star-shaped driver 6 are arranged in series axially, with a gap 22 between them, and no longer engage in one another concentrically. Both the star-shaped driver 6 and the drive output sleeve 7 in turn have an outer toothing 19, 20, the outer toothings 19, 20 engaging in the groove 11 in the rotary spindle 10 in regions which are offset relative to one another axially. Since the spindle 2, which can only rotate above a certain minimum torque (which eliminates any undesired rotation as a result of vibration loading during operation), engages directly in the rotary spindle 7 in such a way, rotations of the element below a limit torque are also prevented in a simple manner, since a small degree of clamping is generated between the drive output sleeve 7 and the star-shaped driver 6. This prevents the air play being reduced beyond a desired value more reliably than according to the prior art, since play between the adjusting device and the tube-like threaded spindle 10 is compensated for.

Since the drive output sleeve according to FIG. 2 is axially shorter than that according to FIG. 3, and since the axial length in FIG. 1 is similar to that in FIG. 3, the design according to the invention does not increase the axial length of the adjusting device relative to the prior art.

| Table of Reference Symbols | |
|---|---|
| Adjusting device | 1 |
| Spindle | 2 |
| Polygonal head | 3 |
| End section | 4 |
| Outer toothing | 5 |
| Star-shaped driver | 6 |
| Drive output sleeve | 7 |
| Inner toothing | 8 |
| Outer toothing | 9 |
| Setting spindle | 10 |
| Grooves | 11 |
| Positionally fixed part | 12 |
| Flange | 13 |
| Lever | 14 |
| Free-wheeling device | 15 |
| Overload coupling | 16 |
| Outer toothing | 17, 18 |
| Outer toothing | 19, 20 |
| Cut-out | 21 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adjusting device for rotating, in order to axially move, a setting spindle of a disc brake, the setting spindle being provided with an inner toothing in the form of one or more axially extending grooves, the adjusting device comprising:
    a drive output sleeve having an outer toothing, said outer toothing being operably configured to engage in the inner toothing of the spindle;
    a release spindle extending axially through the adjusting device and serving to manually release the adjusting device, the release spindle being operably configured to prevent rotation of the release spindle below a limit torque, which limit torque is greater than torques caused by vibration loads during operation of the disc brake;
    wherein at least one of the release spindle and a component rotationally fixedly connected to the release spindle has an outer toothing, the outer toothing engaging directly in the one or more axially extending grooves of the setting spindle.

2. The adjusting device according to claim 1, wherein the drive output sleeve and the release spindle are decoupled from one another.

3. The adjusting device according to claim 2, wherein the component is a star-shaped driver placed on the release spindle, said star-shaped driver being rotationally fixedly connected to the release spindle and having the outer toothing which engages in the inner toothing of the setting spindle.

4. The adjusting device according to claim 3, wherein the drive output sleeve has a cut-out in its peripheral wall, the star-shaped driver extending radially through said cut-out, the star-shaped driver having the outer toothing only in a non cut out said region.

5. The adjusting device according to claim 3, wherein the star-shaped driver and the drive output sleeve are arranged so as to be offset relative to one another axially.

6. The adjusting device according to claim 1, wherein the drive output sleeve and the release spindle are rotatable relative to one another to a limited extent.

7. The adjusting device according to claim 6, wherein the component is a star-shaped driver placed on the release spindle, said star-shaped driver being rotationally fixedly connected to the release spindle and having the outer toothing which engages in the inner toothing of the setting spindle.

8. The adjusting device according to claim 7, wherein the drive output sleeve has a cut-out in its peripheral wall, the star-shaped driver extending radially through said cut-out, the star-shaped driver having the outer toothing only in a non cut out said region.

9. The adjusting device according to claim 7, wherein the star-shaped driver and the drive output sleeve are arranged so as to be offset relative to one another axially.

10. The adjusting device according to claim 1, wherein the release spindle has a single-part construction.

11. The adjusting device according to claim 1, wherein the release spindle has a multi-part construction.

12. The adjusting device according to claim 1, wherein the adjusting device is operably configured for use in a pneumatically operated disc brake.

13. A disc brake, comprising an adjusting device as claimed in claim 1.

* * * * *